US012679077B2

(12) United States Patent     (10) Patent No.:   US 12,679,077 B2
Pereira et al.              (45) Date of Patent:       Jul. 14, 2026

(54) REINFORCED FILM FOR BIOCONTAINERS

(71) Applicant: EMD Millipore Corporation,
           Burlington, MA (US)

(72) Inventors: Brian Pereira, Woburn, MA (US);
           John Saragosa, Melrose, MA (US);
           Joseph Muldoon, Berlin, MA (US)

(73) Assignee: EMD Millipore Corporation,
           Burlington, MA (US)

( * ) Notice: Subject to any disclaimer, the term of this
           patent is extended or adjusted under 35
           U.S.C. 154(b) by 714 days.

(21) Appl. No.: 17/287,253

(22) PCT Filed: Oct. 23, 2019

(86) PCT No.: PCT/US2019/057554
      § 371 (c)(1),
      (2) Date: Apr. 21, 2021

(87) PCT Pub. No.: WO2020/101848
      PCT Pub. Date: May 22, 2020

(65)           Prior Publication Data
US 2021/0347156 A1     Nov. 11, 2021

Related U.S. Application Data

(60) Provisional application No. 62/767,946, filed on Nov.
      15, 2018.

(51) Int. Cl.
      *B32B 27/12*       (2006.01)
      *B32B 3/26*        (2006.01)
            (Continued)

(52) U.S. Cl.
      CPC .............. *B32B 27/12* (2013.01); *B32B 3/266*
          (2013.01); *B32B 5/024* (2013.01); *B32B 27/08*
                             (2013.01);
            (Continued)

(58) Field of Classification Search
      None
      See application file for complete search history.

(56)           References Cited

U.S. PATENT DOCUMENTS 4,795,665 A *   1/1989   Lancaster .............. C08G 67/02
                                           428/36.1
5,891,541 A *   4/1999   Wynne .................. B29C 70/543
                                           428/105
            (Continued)

FOREIGN PATENT DOCUMENTS

CN         1298348 A     6/2001
CN       105392625 A     3/2016
           (Continued)

OTHER PUBLICATIONS

Office Action received for Japanese Patent Application No. 2021-
525588 mailing date Apr. 4, 2023, 11 Pages (5 Pages of English
translation & 6 Pages of Official copy).
          (Continued)

*Primary Examiner* — Thomas J Kessler
(74) *Attorney, Agent, or Firm* — EMD Millipore
Corporation

(57)           ABSTRACT

A material for biocontainers comprising a film formed of
two or more layers forming a body to the film, the film
having an interior and exterior side, and a substrate incor-
porated in the body of the film wherein the substrate is
formed of a fibrous material, wherein each of the at least one
of the two or more layers comprises an ethylene vinyl
acetate resin. A non-constrained pressure test is also dis-
closed.

5 Claims, 11 Drawing Sheets

(51) Int. Cl.

| | |
|---|---|
| *B32B 5/02* | (2006.01) |
| *B32B 27/08* | (2006.01) |
| *B32B 27/30* | (2006.01) |
| *B32B 27/32* | (2006.01) |
| *B65D 83/38* | (2025.01) |
| *G01M 3/32* | (2006.01) |

(52) U.S. Cl.
CPC ............ *B32B 27/306* (2013.01); *B32B 27/32* (2013.01); *B65D 83/38* (2013.01); *G01M 3/3218* (2013.01); *B32B 2250/04* (2013.01); *B32B 2262/0261* (2013.01); *B32B 2307/7244* (2013.01); *B32B 2439/46* (2013.01)

(56) References Cited

U.S. PATENT DOCUMENTS

| | | | |
|---|---|---|---|
| 6,974,612 B1 * | 12/2005 | Frisk ..................... | B65D 5/708 |
| | | | 428/34.3 |
| 2009/0173229 A1 * | 7/2009 | Nagase .................. | B32B 27/40 |
| | | | 96/11 |
| 2011/0084013 A1 | 4/2011 | Lesan et al. | |
| 2013/0302894 A1 * | 11/2013 | Bekele ................... | B32B 27/08 |
| | | | 428/483 |
| 2018/0305098 A1 | 10/2018 | Nyman et al. | |
| 2018/0319559 A1 * | 11/2018 | Toft ........................ | B32B 29/08 |
| 2021/0015579 A1 * | 1/2021 | Liu ......................... | B32B 27/18 |

FOREIGN PATENT DOCUMENTS

| | | |
|---|---|---|
| CN | 106715110 A | 5/2017 |
| CN | 107206763 A | 9/2017 |
| CN | 108290369 A | 7/2018 |
| JP | S60-153722 U | 10/1985 |
| JP | S62-63134 U | 4/1987 |
| JP | 2002-506144 A | 2/2002 |
| JP | 2002-240220 A | 8/2002 |
| JP | 2003-001767 A | 1/2003 |

| | | | | |
|---|---|---|---|---|
| JP | 2004-351859 A | 12/2004 | | |
| JP | 2018-516209 A | 6/2018 | | |
| KR | 10-2017-0103856 A | 9/2017 | | |
| WO | 99/46121 A1 | 9/1999 | | |
| WO | 02/05934 A2 | 1/2002 | | |
| WO | WO-2016042556 A1 * | 3/2016 | .......... | B32B 27/065 |
| WO | WO-2016154180 A1 * | 9/2016 | ............. | B01L 3/508 |

OTHER PUBLICATIONS

Examination Report received for Canadian Patent Application No. 3,116,896 issued on Feb. 24, 2022, 4 pages.

Communication Pursuant to Article 94(3) EPC received for European Patent Application No. 19804923.1 mailing date Mar. 27, 2023, 6 Pages.

Office Action received for Korean Patent Application No. 10-2021-7014248, mailed on Aug. 17, 2022, 11 Pages (5 Pages of English translation & 6 Pages of Official Copy).

Office Action received for Chinese Patent Application No. 201980053675.3 mailed on Aug. 15, 2022, 17 Pages (11 Pages of English translation & 6 Pages of Official Copy).

Office Action received for Chinese Patent Application No. 201980075414.1 mailed on Jul. 28, 2022, 19 Pages (10 Pages of English Translation & 9 Pages of Official Copy).

Office Action received for Japanese Patent Application No. 2021-525588, mailed on Jun. 28, 2022, 11 Pages (6 Pages of English translation & 5 Pages of Official Copy).

Office Action received for Canadian Patent Application No. 3,116,896 mailed on Oct. 4, 2022, 3 Pages.

Office Action received for Korean Patent Application No. 10-2023-7016566 mailing date Jan. 2, 2024, 11 Pages (5 Pages of English translation & 6 Pages of Official copy).

Office Action received for Chinese Patent Application No. 201980075414.1 mailed on Jan. 31, 2023, 14 Pages (8 Pages of English Translation & 6 Pages of Official Copy).

International Search Report and Written Opinion for PCT Application No. PCT/US2019/057554 mailed Feb. 4, 2020, 11 pages.

\* cited by examiner

REINFORCED FILM FOR BIOCONTAINERS

RELATED APPLICATIONS

This present application is a US National Stage application of International Application No. PCT/US2019/057554, filed Oct. 23, 2019, which claims the benefit of priority of U.S. Provisional Patent Application No. 62/767,946, filed Nov. 15, 2018, the entire content of each of which is incorporated herein in its entirety.

FIELD OF THE DISCLOSURE

This disclosure relates to reinforced films. More particularly, embodiments of the films presented within the disclosure relate to reinforced film for resisting cracking or creasing of the film for use in biocontainers.

BACKGROUND

The use of single use bags and other biocontainers is growing in the pharmaceutical and biopharmaceutical industry. These bags, which comprise many films, replace stainless tanks, totes and bins for the processing and transportation of liquids and solids such as raw materials, intermediates and finished goods.

Such films are typically multilayered plastic film laminates and are generally bulky. Typically, laminates include four or more film regions (generally between 4 and 10 sheets). The sheets generally have, at least, an inner area sheet having a surface that is in contact with the liquid or solid within the bag or biocontainer. The inner area sheet comprises multiple films and comprises a generally inert material, such as polyethylene, which is specified for chemical resistance and strength. A first outer area sheet provides support, burst resistance, strength, and some measure of protection to the remaining sheets of the biocontainer, which is generally formed of one or more plastic films, such as polyethylene, polypropylene, polyethylene-vinyl acetate (EVA), polyethylene terephthalate (PET), polyamide (nylon), and the like. At least one barrier sheet is disposed between the inner area sheet and the first outer area sheet, which often has one or more gas impermeable films, such as polyethylene vinyl acetate, polyethylene vinyl alcohol (EVOH), and the like. An additional outer strength area sheet, typically comprising a thick fabric substrate, is normally disposed on the first outer area sheet.

The gas impermeable film(s) are formed of plastic materials which tend to be crystalline and are, accordingly, brittle and/or susceptible to cracking and/or crazing. The folding, handling and manipulation of the bag or biocontainer, during testing, packing, and use stresses the gas impermeable film(s) and leads to the formation of defects, e.g., stress concentrations and cracks, in that layer due to its more brittle nature. These defects are typically described as crack lines and appear whitish in color against the otherwise transparent or translucent film. These cracks tend to propagate and spread through the remaining areas, both horizontally (i.e., through a depth of the area) as well as vertically (across the surface of the area), eventually compromising and, in turn, breaching the biocontainer. These breaches cause leaks and a loss of sterility within an inner volume of the bag or biocontainer.

ASTM F392 describes a test for flexible barrier materials where a sheet of film is wrapped in a cylinder shape, twisted and then compressed for a predetermined number of strokes. After the conditioning, pinholes are found by applying a dye solution to the film. These pin holes are the stress concentrations that lead to cracks and potential failure of the bags and biocontainers.

A new biocontainer and a new multi-layered material for biocontainers, resistant to stress concentrations and cracks, while remaining thin and flexible, would represent an advance in the art.

SUMMARY OF SOME EMBODIMENTS

A material for biocontainers comprising a film formed of two or more layers forming a body to the film, the film having an interior and exterior side, and a substrate incorporated in the body of the film wherein the substrate is formed of a fibrous material, wherein each of the at least one of the two or more layers comprises an ethylene vinyl acetate polymer resin.

In some embodiments, the substrate is a fibrous material. In some embodiments, the substrate is a woven or a non-woven material. In some embodiments, the substrate is a screen having fibers or filaments that are approximately 0.010-0.020 mm in diameter. In some exemplary embodiments, the fibers or filaments are approximately 0.015 mm in diameter.

Embodiments of the present disclosure include a multi-layer film for biocontainers having either a woven or non-woven substrate separating a flexible layer and a contact layer(s) adjacent the interior of the container from a gas impermeable layer, e.g., an oxygen barrier layer, and an abrasion resistant layer(s) exterior to the contact layer(s).

By disposing a woven or non-woven substrate between the contact layer(s) and the more brittle gas impermeable layer(s), the overall performance of the film is enhanced. For example, stress concentration and cracking are significantly reduced, if not eliminated. If cracking occurs in any layer, the woven or non-woven substrate inhibits the propagation of cracks through the depth of the film. Because no crack can propagate from the contact layer to any external layer, e.g., an outer layer, the sterility of an inner volume of the bag formed of the film, is maintained. Without intending to be bound by theory, it is believed that adding the substrate between the contact layer and the gas impermeable layer(s) creates a discontinuity and prevents disruptions of layers by inhibiting the propagation of cracks. In other words, any cracks that start in, for e.g., either the gas impermeable layer(s) or the abrasion resistant layer(s) cannot propagate into or through the inner contact layer.

A film having enhanced stress concentration or crack reduction and cut, puncture and abrasion properties for forming biocontainers is disclosed. The film has a first inner contact layer or layers having a first side forming the interior of the container and a second face farther away from the interior of the container. A stress inhibiting layer which is formed of a woven or non-woven substrate has a first side attached or slightly incorporated into the second face of the first inner contact layer(s). The stress inhibiting layer has a second face farther away from the interior of the container. One or more gas impermeable layers are formed on the second face of the stress inhibiting layer. Other protective and abrasion resistant layers, such as fabrics, e.g., wovens and/or non-wovens, may be optionally incorporated outside the gas impermeable layer(s).

The substrate of choice is constructed of materials such as polymers and/or other materials, e.g., glass, metal, or carbon fibers alone or in combination with polymers. The substrate is flexible so as to allow for the typical folding of the biocontainer. In some embodiments, the substrate may be in the form of a web. The substrate may be a woven or nonwoven material. The substrate generally has an attachment or binding layer by which the substrate can be attached to the inner or outer layers of the film. In some embodiments, the substrate or fabric is on a first face of the gas impermeable layer. In some embodiments, the substrate or fabric is on a second face of the gas impermeable layer. In some embodiments, the substrate or fabric is embedded within the gas impermeable layer, i.e., between a first face of the gas impermeable layer and a second face of the gas impermeable layer. In some embodiments, the substrate or fabric is on a first face of the gas impermeable layer and an outer layer, such as an abrasion-resistant layer. The substrates and layers briefly mentioned above can be integrated into a single film by various techniques, such as embedding, extrusion, calendaring, and/or lamination to maintain the cleanliness and low extractables of the inner volume for biotech manufacturing and validation.

The biocontainer has a closed inner volume that can contain one or more gases, fluids and solids. Openings can be formed in the substrate to provide a visual opening, or window, into the inner volume of the container made by the film or to form a port.

Some embodiments disclosed herein provide a material for biocontainers comprising a film formed of several layers, the film having an interior and exterior side, one or more contact layers, followed by a stress inhibiting layer formed of a woven or non-woven substrate and one or more gas impermeable layer(s) outside of the substrate layer.

Some embodiments disclosed herein provide a material for biocontainers comprising a film formed of several layers, the film having an interior and exterior side, one or more contact layers, followed by a stress inhibiting layer which is formed of a woven or non-woven substrate and one or more gas impermeable layer(s) outside of the substrate layer and optionally one or more additional protective and abrasion resistant layers may be added outside the impermeable layer(s).

Some embodiments disclosed herein provide a biocontainer having a selectively sealed inner volume wherein the biocontainer is formed of one or more pieces of film, the film having an interior and exterior side, the film being comprised of several layers, one or more contact layers forming the interior side, followed by a stress inhibiting layer which is formed of a woven or non-woven substrate and one or more gas impermeable layer(s) outside of the substrate layer.

Some embodiments disclosed herein provide a material formed of a film and a substrate attached to it between the inner contact layer(s) and the outer gas impermeable layer(s) wherein the substrate is formed of a fibrous material selected from the group consisting of woven and non-woven fibrous material.

Some embodiments disclosed herein provide a material formed of a film having one or more contact layers on its inner surface and one or more layers of a gas impermeable polymer resin on its outer surface and a substrate incorporated between the inner contact and outer impermeable layers wherein the substrate is formed of a fibrous material selected from the group consisting of woven fibrous material selected from the group consisting of a material selected from the group consisting of polymers, metal fibers, glass fibers, and carbon fibers.

Some embodiments disclosed herein provide a film having a substrate formed of a material selected from the group consisting of woven fibrous material selected from the group consisting of nylon, e.g., nylon 6 or nylon 6/6, polyester, and aramids, such as KEVLAR® or NOMEX® by the E. I. du Pont de Nemours and Company, Wilmington, DE, USA, and polyolefins.

Some embodiments disclosed herein provide a film having a and a substrate layer incorporated into it wherein the substrate is formed of a non-woven fibrous material selected from the group consisting of a material selected from the group consisting of polymers (including nylon, e.g., nylon 6 or nylon 6/6, polyester, aramids, etc.), metal fibers and glass fibers.

Some embodiments disclosed herein provide a film having a substrate layer incorporated into it wherein the substrate is formed of a non-woven fibrous polymeric material selected from the group comprising, or consisting of, nylons, polyesters, aramids and polyolefins.

Some embodiments disclosed herein provide a film or material having a substrate layer incorporated into it wherein the film is formed of a multilayered film having a first interior side layer formed of one or more layers forming an inner contact zone, one or more layers of a gas impermeable zone and one or more layers of polymers on the exterior side of the of gas impermeable zone forming an outer strength zone and wherein the substrate is incorporated into the film between the inner contact layer and the gas impermeable layers.

Some embodiments disclosed herein provide a material formed of a film and a substrate incorporated into it wherein the substrate has one or more openings to form a window or a port opening.

Some embodiments disclosed herein provide a material formed of a film and a substrate incorporated into it wherein the substrate has one or more elongate openings to form a window.

Some embodiments disclosed herein provide a biocontainer formed of any, all, or selected combinations of the films or materials above.

Some embodiments disclosed herein provide a biocontainer formed of any, all, or selected combinations of the films or materials above which is capable of being pressure tested without the need of constraints or use of low pressures.

Some embodiments disclosed herein provide a biocontainer formed of any, all, or selected combinations of the films or materials above which is capable of dispensing or moving fluid (gas and/or liquid) through the biocontainer by the use of gas pressure contained within the biocontainer (either statically or continually).

These and other provisions will become clear from the description, claims, and figures below. Various benefits, aspects, novel and inventive features of the present disclosure, as well as details of exemplary embodiments thereof, will be more fully understood from the following description and drawings. So the manner in which the features disclosed herein can be understood in detail, more particular descriptions of the embodiments of the disclosure, briefly summarized above, may be had by reference to the appended drawings. It is to be noted, however, that the appended drawings illustrate only typical embodiments of this disclosure and are therefore not to be considered limiting of its scope, for the described embodiments may admit to other equally effective bags, bioreactors, films and/or materials. It is also to be understood that elements and features of one embodiment may be found in other embodiments without further recitation and that, where possible, identical reference numerals have been used to indicate comparable elements that are common to the figures. As used herein, the singular forms "a," "an," and "the" include plural referents unless the context clearly dictates otherwise. Unless defined otherwise, all technical and scientific terms used herein have the same meaning as commonly understood by one of ordinary skill in the art to which these embodiments pertain. Also, the following terms used herein are subject to the following definitions, unless the context indicates otherwise.

BRIEF DESCRIPTION OF THE FIGURES

FIG. 10 shows a cross section of a third embodiment of the film of the present disclosure;

DETAILED DESCRIPTION OF THE DISCLOSURE

Figure 1A:
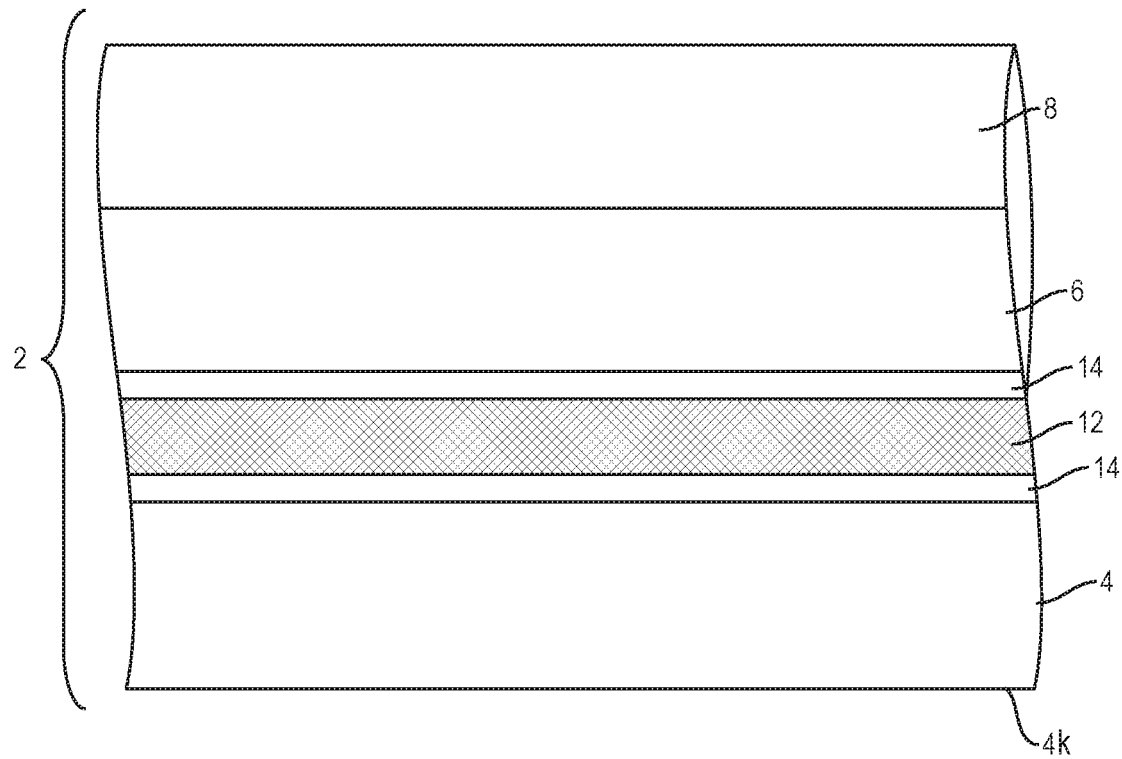
FIG. 1A shows a cross section of a first embodiment of the film of the present disclosure.

FIG. 1A shows a cross section of a first embodiment of an enhanced biocontainer film 2 according to the present disclosure. The film 2 has an inner contact zone 4. The inner contact zone 4 comprises a first face 4k, which is in contact with the liquid within an inner volume of a biocontainer (described herein) formed from the film 2. The inner contact zone 4 may be formed of one or more layers of material that are inert to the liquids that may be in contact with the film and which is/are also low in extractables that might enter the liquid in contact with the inner contact zone 4 or first front face 4k of the film 2. Such materials include, but are not limited to, various polyolefins such as polyethylene. Some embodiments include low density polyethylene, linear low density polyethylene, ultra low density polyethylene, medium density polyethylene, and the like.

Outward of this inner contact zone 4 is a gas impermeable zone 6 formed of one or more layers of resins that are gas impermeable. Such resins include but are not limited to polymers, such as EVA and EVOH, and may also comprise various metal foils such as aluminum, aluminum alloys, and/or various combinations thereof.

Outward of this gas impermeable zone 6 is optionally an outer strength zone 8 formed of one or more layers which provides support, burst resistance, and some measure of protection, e.g., abrasion-resistance, to the remaining zones of the film 2. Such resins include but are not limited to various grades of polyethylene such as high density polyethylene, polypropylene, nylons, PET, EVA, polyamide and the like.

In such embodiments, each of the zones 4, 6, 8 are represented by one layer but, as mentioned above, each zone may be formed of one or more layers bound together, wherein the various zones are formed together as an integral film 2. For example, one or more of the zones, or each zone, can be formed of several layers, according to some embodiments of the disclosure. Also, similar polymer resins can be formed with tie resins between one or more of the zones 4, 6, 8 and/or the layers that may make each of the inner 4, impermeable 6 and outer 8 zones. Tie layers may comprise, for e.g., polyurethanes, blends of EVA and polyethylenes, e.g., low density polyethylene, and other tie layers for forming laminates as is known to those in the art.

Incorporated between the inner contact zone 4 and the gas impermeable zone 6 is a substrate 12. The substrate 12, as shown, is a woven material, although as mentioned above it may be a nonwoven or spunbonded material or, alternatively, it may be a netting material such as DELNET® film, which is an aperture or porous stretched film, marketed by Hercules, Inc., of Wilmington, DE, USA. The substrate 12 may comprise polymer fibers or yarns, metal fibers or yarns, glass fibers or yarns or carbon fiber or yarns or combinations thereof. Polymer substrates, generally, woven, nonwoven or netted can be formed of materials such as nylons, KEVLAR® and other amides, PET, EVA, polyethylenes, polypropylenes and the like.

Polymeric woven fabrics can be formed of any of the previously mentioned polymers. Polymeric woven fabrics are commercially available either as a fabric alone or a coated fabric which has a tie layer 14 (see below) already integrated into it. Such materials are available from a variety of companies such as Eastex Products Inc. of Holbrook, MA, USA; PGI Inc. of Charlotte, NC, USA; or Freudenberg & Co. of Manchester, NH, USA. Nonwovens can be for example spunbonded or blown materials and are commercially available for instance as TYPAR® or TYVEK® sheets from E.I. duPont De Nemours of Wilmington, DE, USA.

Metal substrates, generally available as woven or nonwoven, can be formed of stainless steel, aluminum and the like. Some embodiments of the disclosure include a noncorrosive metal or a metal treated with a noncorrosive outer layer such as epoxy or nickel. These are typically provided as a woven cloth or a screen material. Glass substrates are generally woven or nonwoven. Fiberglass cloths and fiberglass mats are also suitable. Carbon fiber substrates can also be found commercially in woven, web forms such as PANEX® 30 or 35 carbon fiber webs from Zoltek Corp., St Louis, MO, USA.

The substrate 12 can be incorporated into the film between the contact and gas impermeable zones by one or more attachment or tie layers 14 (see FIG. 1A). In some embodiments, the tie layer 14 is a thermoplastic resin. Also, in some embodiments, the substrate 12, as shown, is at least partially embedded into the tie layer 14. Some embodiments include wherein the tie layer(s) 14 include polymers such as an ethylene vinyl acetate (EVA) resin alone or blended with a second polymer such as polyethylene. In some embodiments, the tie layer 14 is a blend of an EVA resin and a low density polyethylene resin as used in the contact layer 4. Also, in some embodiments, the substrate 12 is shown as a non-woven although a woven can work just as well. The tie layer 14 may be provided with the substrate 12 or added to the substrate 12 before use. The tie layer(s) 14 may be incorporated into the substrate 12. Alternatively, the substrate 12 can comprise a different material, such as the materials of either the inner zone 4 or impermeable zone 6 and the tie layer(s) 14 are used to attach the substrate 12 between the inner 4 and impermeable 6 zones. For example, attaching means may be accomplished via one of many lamination or spreading processes as are known to those in the art.

In some embodiments, the tie layer(s) 14 can be formed as part of the film making process as an additional layer especially when a lamination process is used. In some instances, the substrate 12 does not need a tie layer 14 if the substrate 12 is incorporated into the film 2 as a heat bonded material or is integrated as part of the film manufacturing process as shown below. In this embodiment, the substrate 12 is shown as a woven material although it may equally be a non-woven as shown in FIG. 1A. As above, the inner contact zone 4 comprises a first face 4k, which is in contact with the liquid within an inner volume of a biocontainer formed from the film 2.

Figure 1B:
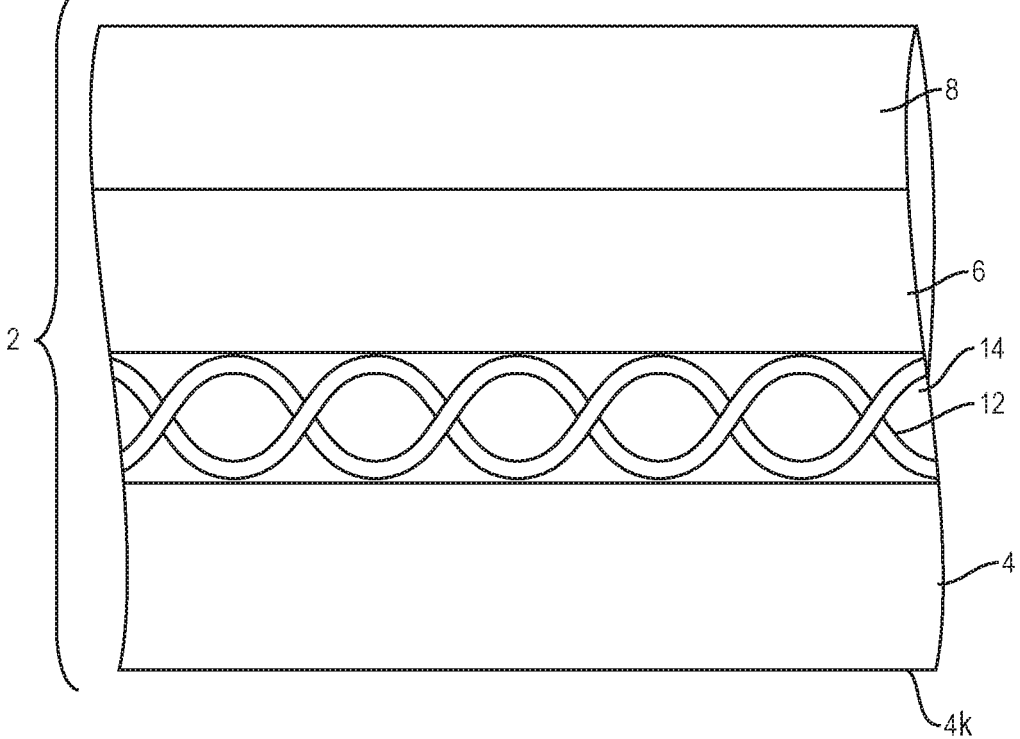
FIG. 1B shows a cross section of a second embodiment of the film of the present disclosure.
Figure 1C:
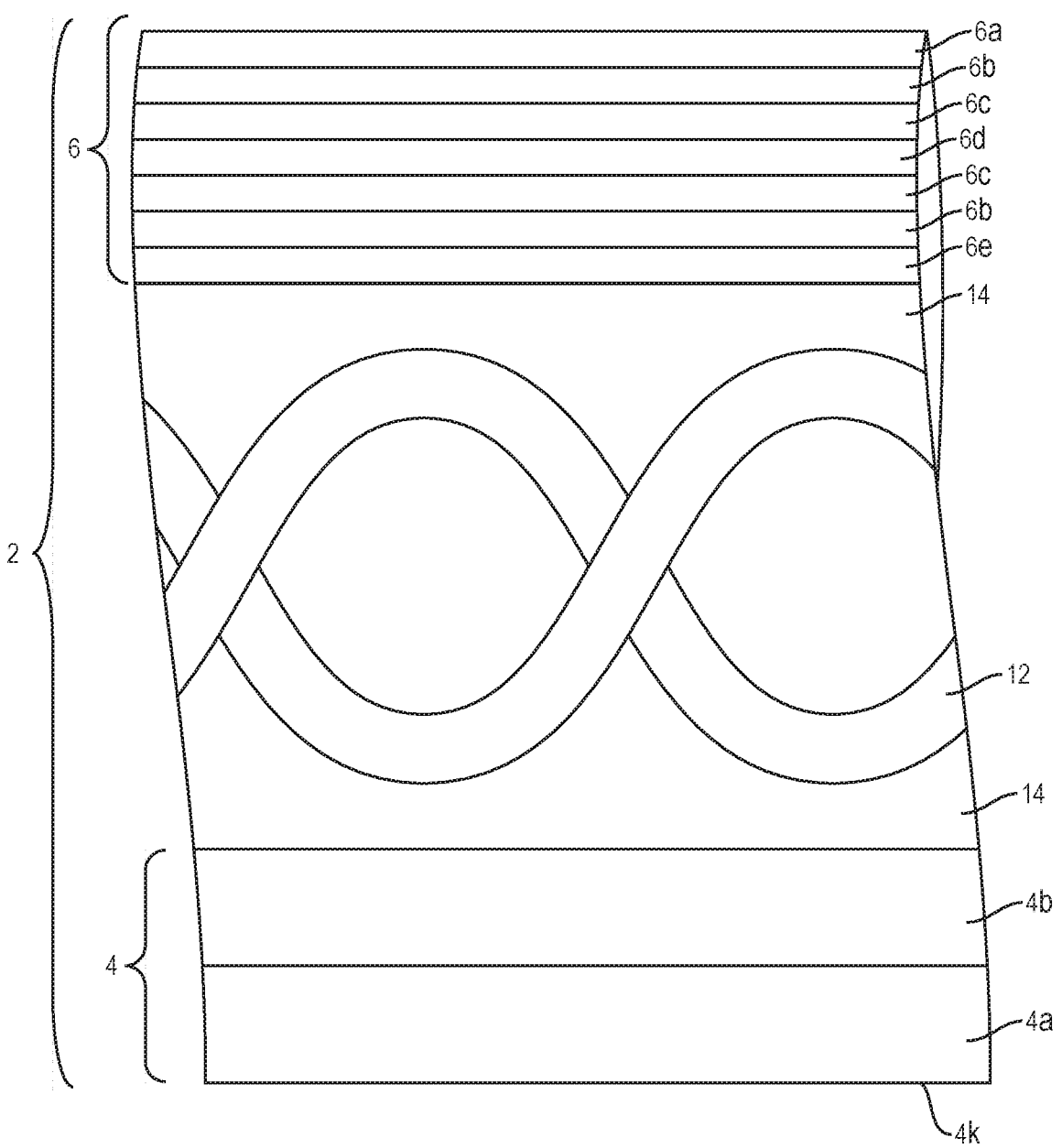

FIG. 1C shows a cross section of a third embodiment of the film 2 of the present disclosure. The film 2 comprises an inner contact zone 4. The inner contact zone 4 comprises a first face 4k, which is in contact with the liquid within an inner volume of a biocontainer (described herein) formed from the film 2. The inner contact zone 4 may be formed of one or more layers of material that are inert to the liquids that may be in contact with the film and which is/are also low in extractables that might enter the liquid in contact with the inner contact zone 4 or first front face 4k of the film 2. In some exemplary embodiments, the inner contact zone 4 comprises two layers. For example, as depicted, the inner contact zone 4 includes an outer contact layer 4a, which comprises, for example, a polyolefinic material. In some embodiments, the outer contact layer 4a is a polyethylene layer. In some embodiments, the outer contact layer 4a is a polyethylene layer that is one of ultra low density polyethylene (ULDPE), e.g., a density of 0.857-0.908 g/cm$^3$, a polyolefin plastomer, or a polyethylene-octene copolymer. In some embodiments, the polyethylene layer comprises ENGAGE® polyolefin elastomers, and some exemplary ethylene alpha-olefin and polyethylene-octene copolymer resins, as marketed by the Dow Corp. of Midland, MI, USA. In some embodiments, the ENGAGE is a grade 8480, marketed by Dow Corp. In some embodiments, the inner contact zone includes an inner contact layer 4b, which comprises, for example, an EVA polymeric material. Also, in some embodiments, the inner layer 4b and outer layer 4a are joined together using a blown film process, as is known to those in the art.

Outward of the inner contact zone 4 of the film 2 of the embodiment depicted in FIG. 1C is a gas impermeable zone 6 formed of one or more layers of materials that are gas impermeable. Such materials include but are not limited to polymers, such as EVA and EVOH, and may also comprise various metal foils such as aluminum, aluminum alloys, and/or various combinations thereof. In some embodiments, the gas impermeable zone 6 comprises multiple layers. In some exemplary embodiments, the gas impermeable zone 6 comprises an outer layer 6a comprises a polyethylene, such as an LDPE or LLDPE; a second polyethylene layer 6b, such as ENGAGE® polyolefin elastomers, a tie layer 6c, such as a modified polyethylene layer (for e.g., a LDPE modified with maleic anhydride), an EVOH layer 6d, a second tie layer 6c, another second polyethylene layer 6b, and an EVA layer 6e.

Disposed between the inner contact zone 4 and the gas impermeable zone 6 is a substrate 12 for preventing the propagation of cracks from the inner contact zone 4 to the gas impermeable zone 6 and vice versa. The substrate 12 also provides support and burst resistance. The substrate 12 can be incorporated into the film between the contact and gas impermeable zones by one or more attachment or tie layers 14. In some embodiments, the tie layer 14 is embedded into the substrate 12, as shown. Preferred tie layers 14 include plastics such as poly (ethylene vinyl acetate) alone or blended with a different polymer such as polyethylene. In some embodiments, the tie layer 14 comprises a blend of EVA and a low density polyethylene, wherein the EVA is a high flow EVA. For example, in some embodiments, the melt flow for the tie layer 14 may range from approximately 3-25 g/10 min.

In some embodiments, the tie layer 14 comprises a blend of EVA and a low density polyethylene as used in the contact layer 4. Also, in some embodiments, the substrate 12 is shown as a non-woven although a woven can work just as well. The tie layer 14 may be provided with the substrate 12 or added to the substrate 12 before use. The tie layer(s) 14 may be incorporated into the substrate 12. Alternatively, the substrate 12 can comprise a different material, such as the materials of either the inner zone 4 or impermeable zone 6 and the tie layer(s) 14 are used to attach the substrate 12 between the inner 4 and gas impermeable 6 zones. For example, attaching means may be accomplished via one of many lamination or spreading processes as are known to those in the art.

In some embodiments, the tie layer(s) 14 can be formed as part of the film making process as an additional layer especially when a lamination process is used. In some instances, the substrate 12 does not need a tie layer 14 if the substrate 12 is incorporated into the film 2 as a heat bonded material or is integrated as part of the film manufacturing process as shown below. In this embodiment, the substrate 12 is shown as a woven material although it may equally be a non-woven as shown in FIG. 1A. As above, the inner contact zone 4 comprises a first face 4k, which is in contact with the liquid within an inner volume of a biocontainer formed from the film 2.

In some exemplary embodiments, the film 2, as depicted in FIG. 10 comprises a contact zone 4 that is approximately 0.008-0.012 mm in thickness, a gas impermeable zone 6 that is approximately 0.006-0.010 mm in thickness, and a substrate layer 12, which includes the tie layer 14, that is approximately 0.200-0.250 mm in thickness. In some embodiments, the film 2 is approximately 0.350-0.410 mm in thickness.

The three films, i.e., the inner contact zone 4, the gas impermeable zone 6, and the substrate 12 having the EVA resin 14 disposed therebetween, are laminated together. In some embodiments, three films, i.e., the inner contact zone 4, the gas impermeable zone 6, and the substrate 12 having the EVA resin 14 disposed therebetween, are laminated together using the apparatus of FIG. 3, as shown below.

Figure 2A:
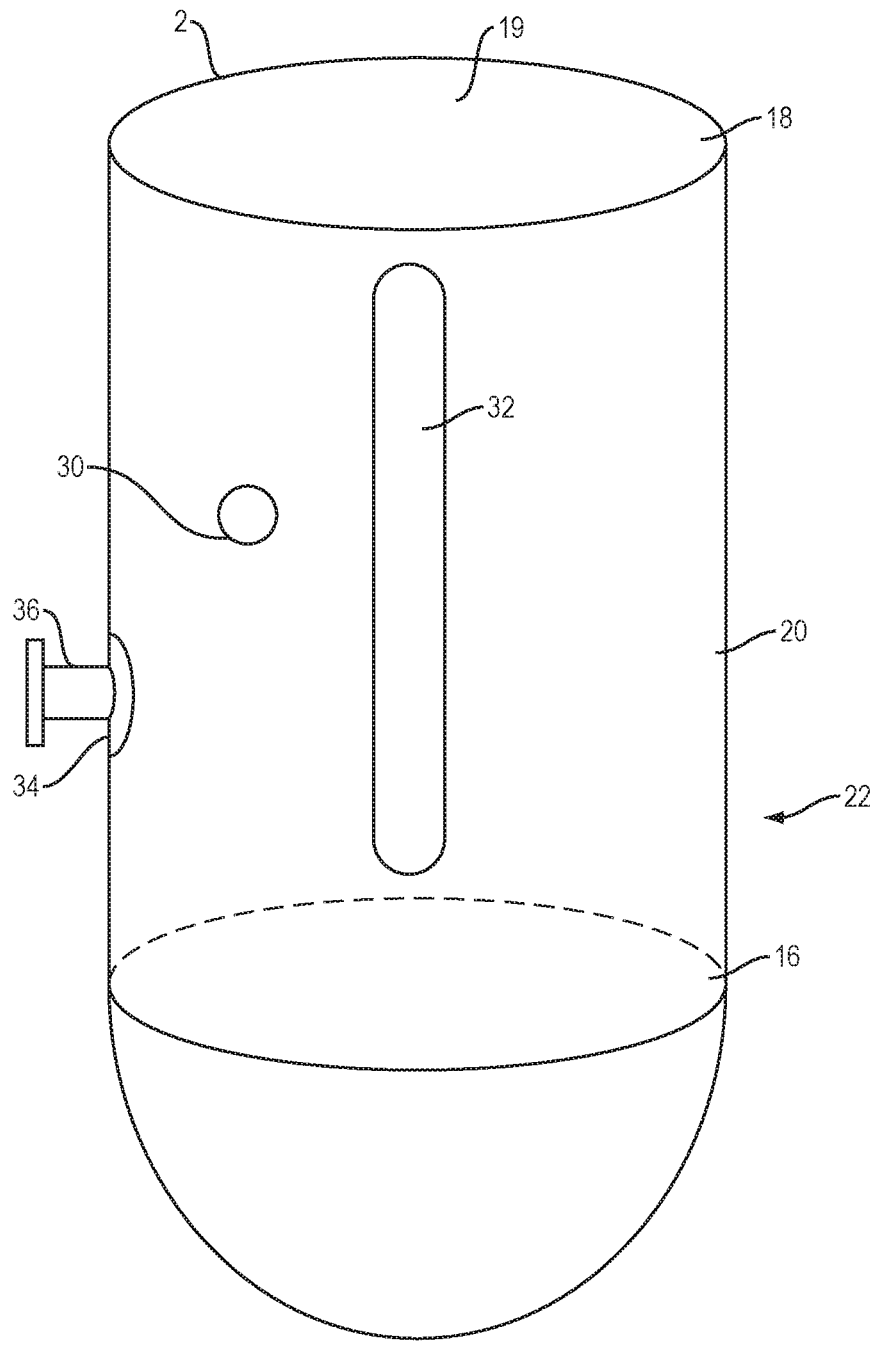
FIG. 2A shows a biocontainer formed in accordance with the present disclosure in cross sectional view.

In FIG. 2A, a biocontainer 22 is shown in its inflated or filled configuration. Typically, the biocontainer 22 is filled with at least some liquid and some gas such as air near the top, although for testing, the biocontainer 22 may be filled with air or selected gases only. The biocontainer 22 is called a 3D or three-dimensional bag.

The film 2, as described in various embodiments above, is cut to shape into one or several pieces which form the bottom 16, top 18 and side(s) 20 of the biocontainer 22 as shown in FIG. 2. The biocontainer 22 has an inner volume 19 formed by the bottom 16, top 18 and side(s) 20 of the biocontainer 22 which can be used to hold various fluids (gases, liquids, or both) and/or solids.

Also shown in FIG. 2A are a port 30 and a window 32, which are formed by making an opening in the substrate 12, as described above, before incorporation into the film 2. The port 30 and the window 32 are optional and are used for viewing the inner volume 19 and/or any contents therein. As shown at viewing port 30, the opening is circular. However, any shape for the viewing port 30 may be used. The window 32 is shown as elongate so as to allow one to view essentially the entire height of the biocontainer 22 when filled or partially filled with liquid. One may form a rim around the opening such as by impregnating the cut edge and an adjacent substrate, such as substrate 12, of viewing port 30 or window 32 with a polymer or attaching a polymeric disk with an open center sized to mate with the desired opening size of the viewing port 30 or window 32, to the substrate 12 to reduce or eliminate any potential for substrate fiber(s) to become loose. Alternatively, when using a tie layer, such as tie layer 14 as described herein, such a tie layer 14 provides sufficient attachment to the fiber(s) of the substrate 12 to prevent loose fibers from occurring. Loose fibers can otherwise contaminate a biological liquid within biocontainers.

Additionally, one can form port openings in the substrate 12 and/or film 2 as shown at a port opening 34. The port opening 34 can be cut using a die, punch or knife, whether heated or unheated and/or a laser, as desired, to the finished material before it is formed into a biocontainer. Other methods of cutting can be used. If desired, one may first cut the substrate 12 before its incorporation into the film 2 and then use it as a guide to cut the film 2 beneath and above it to form the port opening 34. The biocontainers described herein may further comprise a fitting 36.

Alternatively, using a transparent or translucent material for the substrate 12, such as nylon, polyethylene or polypropylene, allows formation of a window 30, 32 by heat melting the substrate 12 in the desired area to form the window 30, 32 before the substrate 12 is attached to the film 2. A first means for heating is to use an iron or heated platen to heat/soften or melt the substrate 12 in the desired area with pressure as well as to cause the substrate to form the desired window. Alternatively, a RF heater or an impulse welder can heat and melt the substrate 12. The window 30 can be formed in the substrate 12 before it is attached to the film 2. Alternatively, for embodiments wherein the window 30 is formed in the substrate 12 after its attachment to the film 2, the substrate 12 is of a material having a melting point lower than that of the film 2 and it is only heated to the temperature below that of the melting point of the film 2.

Figure 2B:
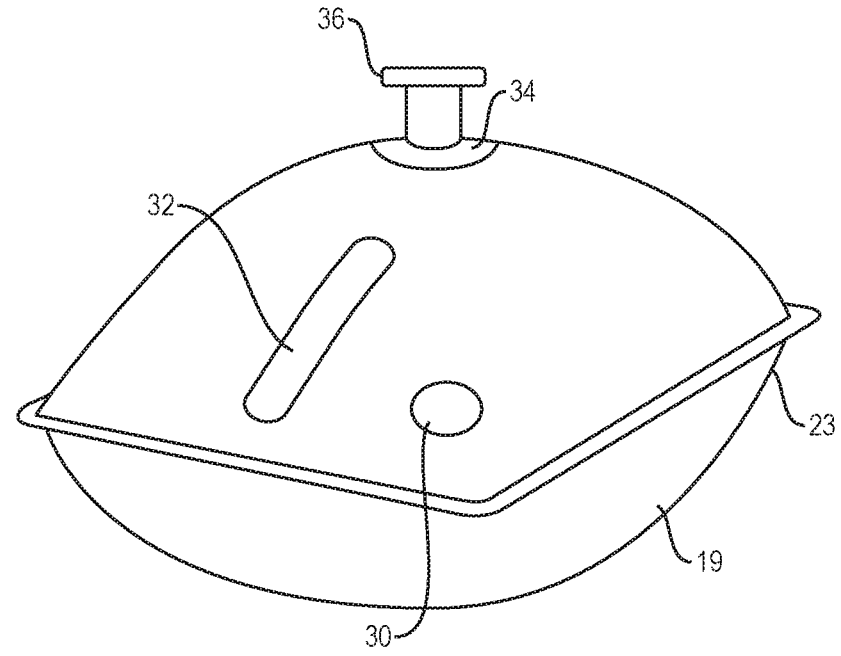
FIG. 2B shows another biocontainer formed in accordance with the present disclosure in planar view.

FIG. 2B shows what is known as a two-dimensional (2D) or pillow type biocontainer 23. The biocontainer 23 is formed generally of one or two pieces of film, such as the film 2, as described above. The film (if one piece I used) is folded on itself and sealed along its outer edges to form the biocontainer 23. Alternatively, the biocontainer 23 may be formed of two pieces of film that are sealed together along their outer edges. In either configuration, an inner volume 19 is formed that is selectively sealed off from the environment. As in FIG. 2A, the use of windows 30, 32, port openings 34 and/or fittings 36 can be used and assembled in the same manner as in FIG. 2A.

Figure 3:
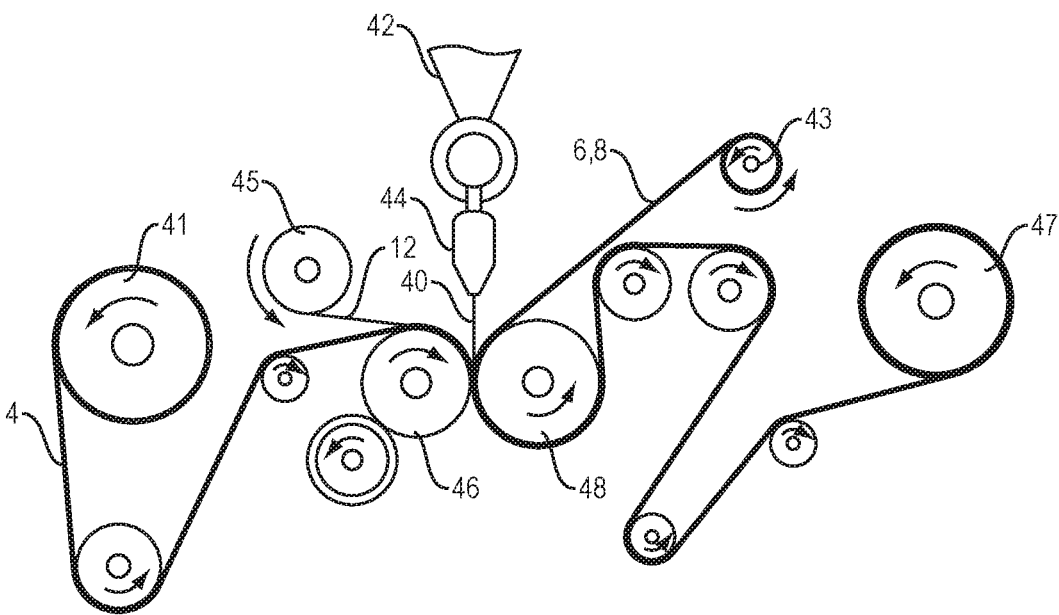
FIG. 3 shows a method of forming the material according to the present disclosure in planar view.
Figure 4:
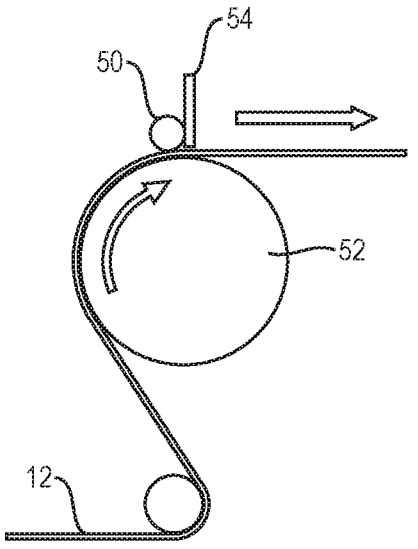
FIG. 4 shows another method of forming the material according to the present disclosure in planar view.

FIGS. 3 and 4 illustrate typical methods for making a film, such as some embodiments of film 2, as described above, according to the present disclosure. The substrate 12, for some embodiments in conjunction with a tie layer 14 (shown below), is incorporated between the contact layer 4 and the barrier layer 6 with a protection layer formed outside of the barrier layer 6 as described above. The film 2 of the present disclosure can be made by a variety of methods including but not limited to heat lamination, adhesive or chemical bonding, calendaring, and the like.

FIG. 3 shows an extrusion coating method that takes a preformed contact layer 4 from supply roll 41 and a preformed barrier layer 6/protection layer 8 combination from supply roll 43 and the substrate 12 from supply roll 45 and incorporates the substrate 12 between those layers (4 and 6/8 combination) by extruding one or more tie layers 14 (shown below) onto/into one or both sides of the substrate 12 through an extruder 42 having one or more dies 44 while still in the melt phase onto/into the chosen substrate 12. The substrate 12 is typically of a higher melting point material to avoid dimensional changes upon contact with the molten resin 40 which forms a tie resin 14. A pressure roll 46 and a chill roll 48 mechanism is employed to ensure that the mating materials/layers 4, 6/8 and 12, 14 are combined with good adhesion into one, new, integral multilayered film 2. In this context, integral indicates that the various layers cannot be laminated or deconstructed without destroying the film 2. The finished product, e.g., the film 2, is taken up on a windup roll 47. If desired, a second extrusion head (not shown) can be placed between zone 4 and the substrate 12 to create a tie layer 14 there as well. In some embodiments, the layers 4, 6/8 and 12, 14 are laminated using melt temperatures of 220° C. to 240° C. In some embodiments, the melt temperatures range from approximately 230° C. to 235° C. In some exemplary embodiments, the melt temperatures range from approximately 231° C. to 233° C. In some exemplary embodiments, the melt temperatures range are selected such that no substantial crosslinking of the EVA resin occurs.

FIG. 4 is an alternate method used for very thin polymer coatings 50, which is usually a mixture of polymer and volatile solvent for the polymer, the solvent is vaporized downstream via a series of ovens (not shown). The substrate 12 is moved over a coating drum 52 while the coating compound 50, comprising the polymer and volatile solvent, is applied such as by a coating knife 54. The result is a well adhered, multilayer structure. In some embodiments, an additional protection layer, such as protection layer 8, as described above, is applied to the substrate 12. In some embodiments, an additional protection layer, such as protection layer 8, as described above, is applied to the film 2. In some embodiments, the protection layer 8 comprises a polyolefin, such as a low density polyethylene, a linear low density polyethylene, an ultralow density polyethylene, a medium density polyethylene, and others as is known to those in the art. In some embodiments, the protection layer 8 comprises a polyolefinic copolymer resin. In some embodiments, the protection layer 8 comprises a plastomer resin. In some embodiments, the protection layer 8 comprises an ethylene alpha-olefin resin or a polyethylene-octene copolymer resin. For example, some exemplary ethylene alpha-olefin resins are marketed under the brand AFFINITY® by Dow Corp., of Midland, MI, USA.

Another method of combining multilayered structures is to apply a layer of hot melt thermoplastic to either the substrate surface that will be adjacent the contact zone 4 or to gas impermeable zone 6 and then press them into contact with each other to form a good bond.

The biocontainer 22, 23 has an inner volume 19 defined by its sealed sides, top and bottom. The inner volume 19 can range from 1 liter to 2000 liters or greater. Typically, there are a variety of sizes made available such as 1, 5, 10, 20, 50, 100, 200, 500, 1000 and 2000 liters although custom volumes therebetween, or even larger than 2000 L, may also be made as desired. The biocontainer 22, 23 may be open to the environment. For example, the top may be open or it can be selectively closed from the environment with various ports and inlets or outlets providing selective access to the inner volume of the biocontainer 22, 23. It can used to store or process fluids, (gases, liquids or combinations of both) and/or solids and may be formed into a bioreactor or mixer or storage bag. For example, the biocontainer 22, 23 may be a mixer and may be used to mix various liquids together or a liquid or liquids with one or more solids such as buffer media, cell culture media and the like. It may also be a bioreactor or fermentor used to grow animal cells such as insect cells or mammalian cells, including Chinese Hamster Ovary cells (CHO); bacteria such as *E. coli*; yeasts; fungi; and the like. The biocontainer 22, 23 or bioreactor may be used for the storage or transport of liquids such as intermediate or finished pharmaceutical products. Such biocontainers 22, 23 are of particular value in pharmaceutical and biopharmaceutical, veterinary, nutriceutical, stem cell manufacturing, antibody drug conjugates (ADC) manufacturing and vaccine production. Various additions such as impellers, sensors, gas and liquid tube sets and the like, as are known to those in the art, may also be added as desired.

Figure 5A:
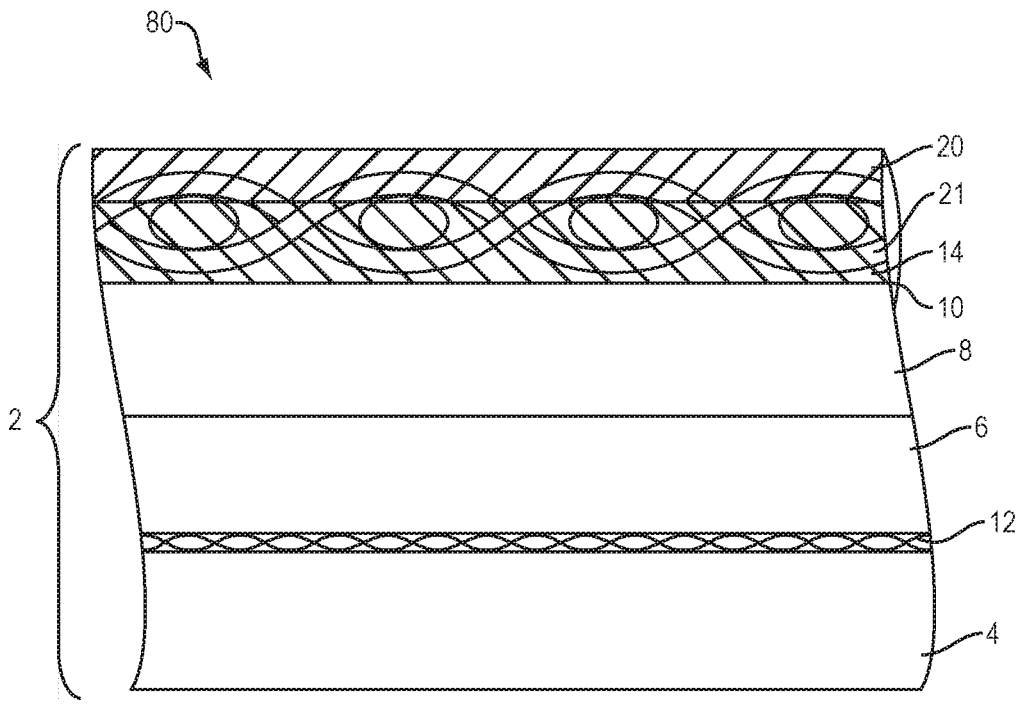
FIG. 5A shows a first cross section of another embodiment of the present disclosure.
Figure 5B:
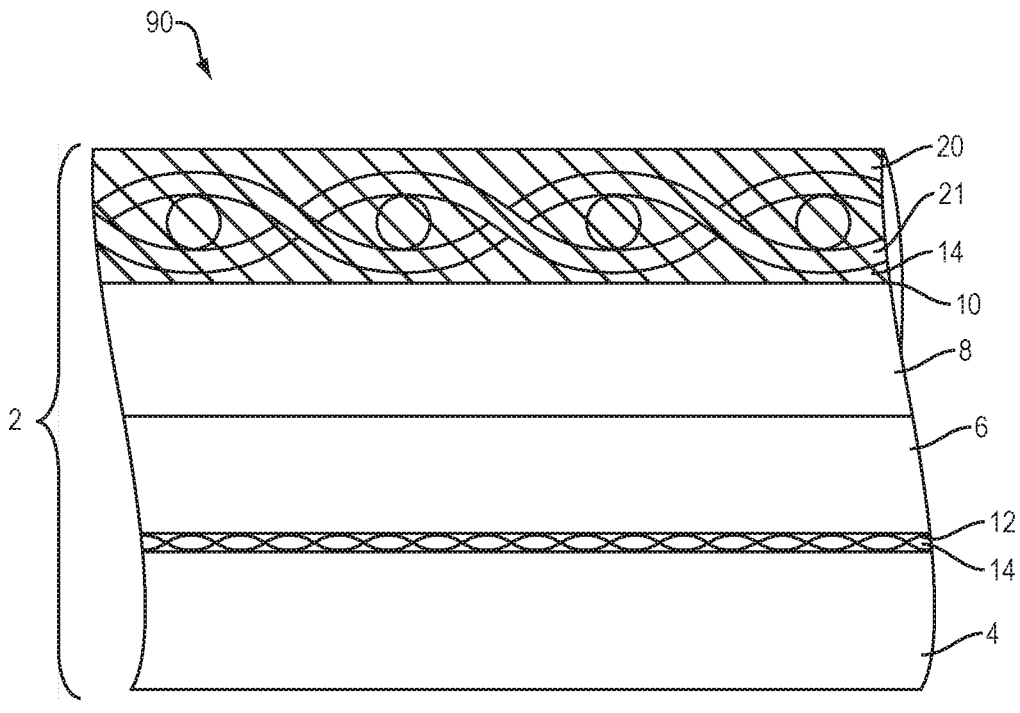
FIG. 5B shows a second cross section of a further embodiment of the present disclosure.

Alternative embodiments of the film 2 of FIGS. 1A and 1B are shown in FIGS. 5A and 5B. FIG. 5A shows a first cross section 80 of another embodiment of the present disclosure. In addition to the elements described in relation to the embodiment of FIGS. 1A and 1B, these embodiments have a second substrate 21 and an outer protective layer 20 over or incorporated into the outer surface of the second substrate 21. The fibers of the substrate 21 are encapsulated, making it more difficult to cause unraveling or pilling of the fibers of the substrate 21 and to further improve abrasion resistance of the resultant structure. Materials for such a layer include polyethylene, polypropylene, nylons, EVA, EVA copolymers, styrene-butadiene polymers, copolymers and blends, polyesters, PET, thermoplastic elastomers (TPEs), polyurethanes, and/or like resins.

The outer protective layer 20 can be attached to the outer surface of the substrate 21 in the form of an additional resin layer such as a thermoplastic material or film which is, in some embodiments, at least partially embedded into the substrate 21, as shown. The outer protective layer 20 may be provided with the substrate 21 or added to the substrate 21 before use. Alternatively, the outer protective layer 20 can be formed as part of the film-making process as an additional layer, e.g., when a lamination process is used. FIG. 5B shows a second cross section 90 of a further embodiment of the present disclosure. The second cross section 90 is similar in structure to the first cross section 80. In some embodiments, an additional tie layer 14 is used when adhering the substrate 12 so as to enclose or envelope the thickness of the substrate 12, as shown in FIG. 5B. In some embodiments, the tie layer(s) 14 comprise a linear low density polyethylene resin.

In some instances, the outer protective layer 20 does not need a tie layer if the layer is partially incorporated into the outer surface of the substrate 12 as a heat bonded material or is integrated as part of the film manufacturing process such as a hot melt layer incorporated or extruded into a portion of the depth of the outer surface of the substrate 12 (FIG. 5A).

The substrate 12, 21 can be formed of a clear or colored fibrous material. In some instances, it is desirable to have the substrate 12, 21 formed of an opaque or light blocking material so that liquids which are sensitive to light, including ultraviolet (UV) and normal "white" light can be shielded by the substrate 12, 21 to reduce or eliminate damage that would otherwise occur in a clear or transparent bag. Additives to block light, including UV light (additives such as titanium dioxide, zinc oxide and like or organic UV blockers are well known), can also be added to the substrate 12, 21 or the coating or the tie layer 14, if used, or one or more layers of the film 2 as desired. Such light blocking additives are well known to one of skill in the art and are available from a variety of sources such as the Colormatrix™ Ultimate™ or the Colormatrix™ Lactra™ or the Oncap™ products from Polyone Corp., Avon Lake, OH, USA.

It is well known that film bags, when inflated, stretch under pressure. In some instances, inflation can cause the film 2 to stretch in unacceptable ways. For example, where a thinning of the film or other such defect occurs, the film portion that is thinner or has a defect may expand more rapidly than the rest of the film and create a bubble or other deformity in the film surface. This deformity can burst or be subject to greater/quicker wear under abrasion than the rest of the film and may lead to leaks. Likewise, even where no thinning or other defect is in the film, an unconstrained film may inflate at different rates due to the way it was folded or unfolded or where it may have a crease or overlap or wrinkle in the film which can also lead to such bubbles or other defects, such as delamination between layers. Yet bags are often checked before use by a pressure test to ensure there are no pinholes or unsealed seams that may have been formed by a manufacturing error or by shipment and handling. This test is generally a pressure decay test in which the bag is inflated and left for a period of time while the pressure, and any decay thereof, is recorded.

However due to the bag's ability to stretch and create deformities, the pressure decay test needs to be done at a low pressure, e.g., typically under 1 and generally around 0.5 psi (3.5 KPa) and the bags are typically constrained such as by constraining the bag between two spaced apart restraining plates or being placed in a vacuum chamber or being placed into a holder of defined volume for that bag. Each of these techniques reduce or prevent the likelihood of a defect being formed on inflation. However, due to the low pressure used the level of detection is corresponding low, meaning that only significantly large defects will be identified (e.g., 1000-2000 μm for bags ≥1000 L). Likewise, when using a walled chamber of spaced plates, some defects are covered or blinded and do not get detected. Lastly, as the pressure is low, the time involved in running such a test and determining whether a problem exists is extensive (5-10 minute test cycle). There is a need for a better, more accurate and quicker leak detection test before use. Absent such a test, a more robust material and/or biocontainer made therefrom, alleviates the need for a more accurate leak detection test.

With the present disclosure, one now has a bag, such as biocontainer 22, 23, which does not need to be mechanically constrained during a pressure decay test. Instead the substrate 12, 21 itself constrains the film 2 and causes it to expand at an even rate thus reducing the potential for deformities, such as bubbles, being formed during the test. It is to be understood that any biocontainer disclosed herein, whether it has both the substrate 12 and substrate 21, or only either one, need not be mechanically constrained during testing. Additionally, the substrate 12, 21 also allows one to use higher pressures (upwards of 3.5 to 15 psi (24-103 KPa)). This leads to more accurate and high levels of detection, making smaller defects, if they exist, detectable. Moreover, the use of a higher pressure allows for the test to be sped up significantly.

Figure 6:
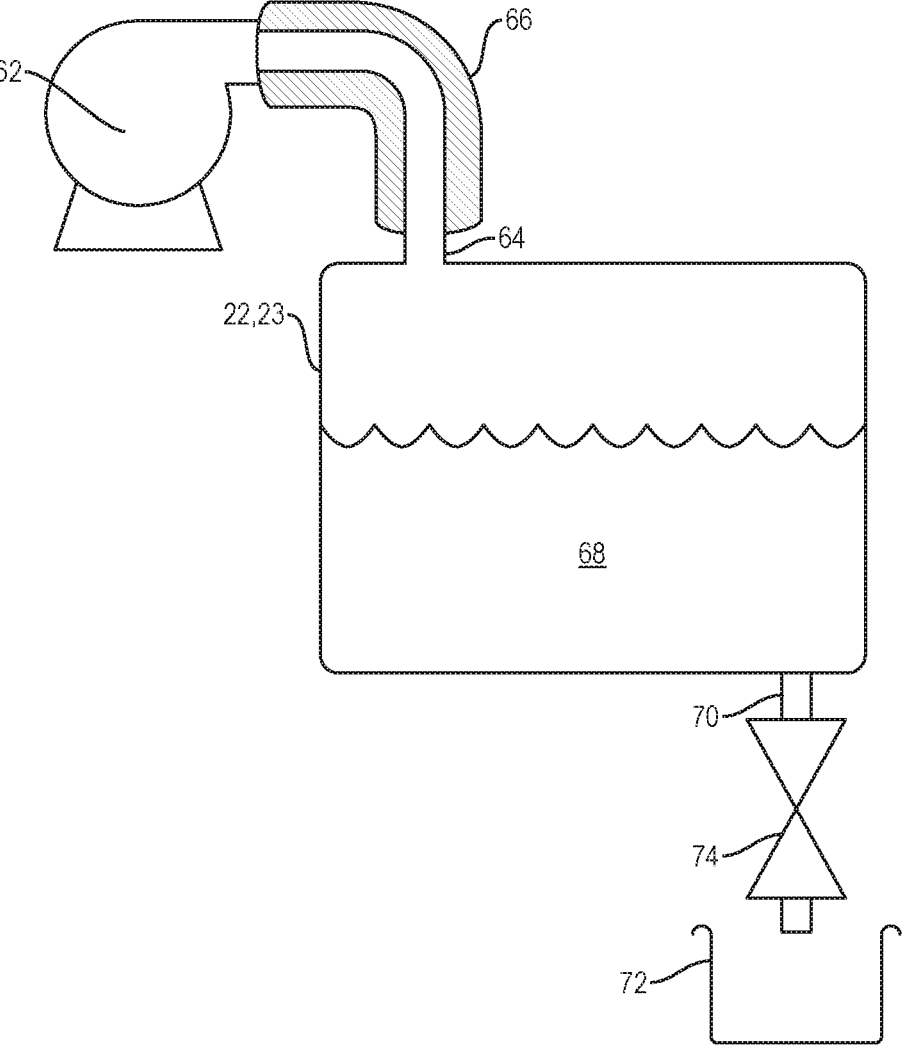
FIG. 6 shows a further embodiment of a biocontainer formed in accordance with the present disclosure in cross sectional view.

As shown in FIG. 6, an additional feature of the present disclosure is that a bag 22, 23 can be self-dispensing or self-flowing, simply by using the air pressure within it to allow for the movement of liquid out of the bag. The bag 22, 23 can have an air pressure system 62 such as an air pump or a supply of pressurized air attached to an inlet or port 64 via a tube or conduit 66. The bag 22, 23 can be pressurized to a pressure of up to 15 psi (103 KPa) and this head pressure in the bag 22, 23 can be used to cause the flow of liquid 68 within the bag 22, 23 out an outlet or second port 70 when desired and as desired. As shown, the outlet 70 is located above a receiving vessel 72 or it may be connected to another bag (not shown) via a tube or conduit or to a manifold containing a series of smaller bags (not shown) or to a dispensing head such as a valved needle (not shown) for dispensing the liquid 68 into vial or syringes. The outlet 70 may have a valve 74 or a clamp to selectively open and close the outlet as desired. The bag 22, 23 may contain additional ports for pressure gauges and the like as well as one or more windows 30 as described above.

If desired, one can maintain the pressure within the bag 22, 23 constant by supplying additional air pressure as the liquid is dispensed. This allows one to maintain the desired head pressure within the bag 22, 23 so that the liquid can be fully dispensed at a constant rate from the bag 22, 23. Alternatively, one can simply apply a fixed head pressure that reduces as liquid is dispensed from the bag 22, 23.

In either embodiment, the use of valves, check valves, clamps, pressure gauges, windows and the like can also be used to maintain the system in its desired state and providing the desired dispensing or movement of liquid 68 out of the bag 22, 23 as needed. All of these elements are well known to one of ordinary skill in the art.

Either embodiment eliminates the need for pumps to move liquid out of the bag 22, 23. This can be of advantage in reducing system cost and complexity and in reducing the potential for shear damage to shear sensitive products that are dispensed from the bag 22, 23 such as various protein solutions and the like.

Figure 7:
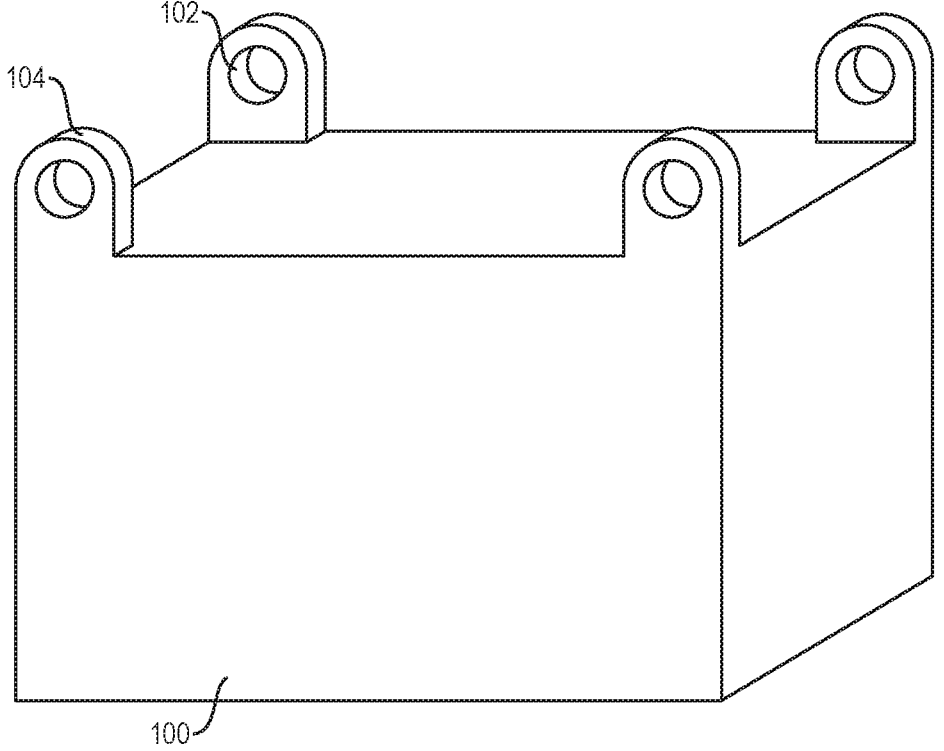
FIG. 7 shows a further embodiment of a biocontainer formed in accordance with the present disclosure in planar view.
Figure 8:
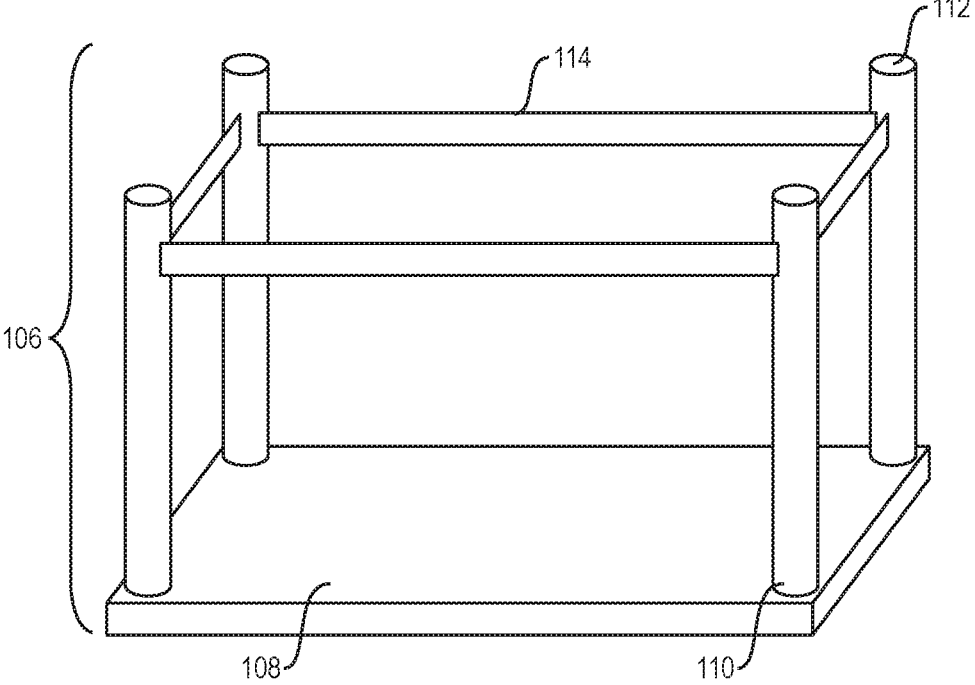
FIG. 8 shows an embodiment of a holder for the biocontainer formed in accordance with the present disclosure in planar view.

FIG. 7 shows a further embodiment of a biocontainer 100 formed in accordance with the present disclosure in planar view. The biocontainer 100 may be formed of any embodiment of the film 2, as described herein, for e.g., the embodiments described in FIGS. 1A, 1B, 10, 5A, and 5B. In a further embodiment of the present disclosure, the bag or biocontainer 100 may contain one or more grommets or eyes 102. The grommets or eyes 102 are typically at upper corners 104 so that the bag 100 can be simply hang from a hook or a carrier as shown in FIG. 7. As the substrate makes the bag 100 more resilient and self-supportive, there is less of a need for a rigid enclosed support vessel such as a vat or bin as is typically used with such containers. This allows one to use a simple framework 106, as shown in FIG. 8. FIG. 8 shows an embodiment of a holder for the biocontainer formed in accordance with the present disclosure in planar view. In FIG. 8, the framework 106 is formed of a base 108, and at least four vertically extending rods 110. As shown, near the top ends 112 of each of the rods 110 are secondary substantially horizontal rods 114. Each secondary substantially horizontal rod 114 is connected to the adjacent rods 110 to complete the framework 106. In some embodiments, the grommets 102 are attached to the top ends 112 and the bag 100 allowed to hang inside the framework 106 as shown in FIG. 9.

Figure 9:
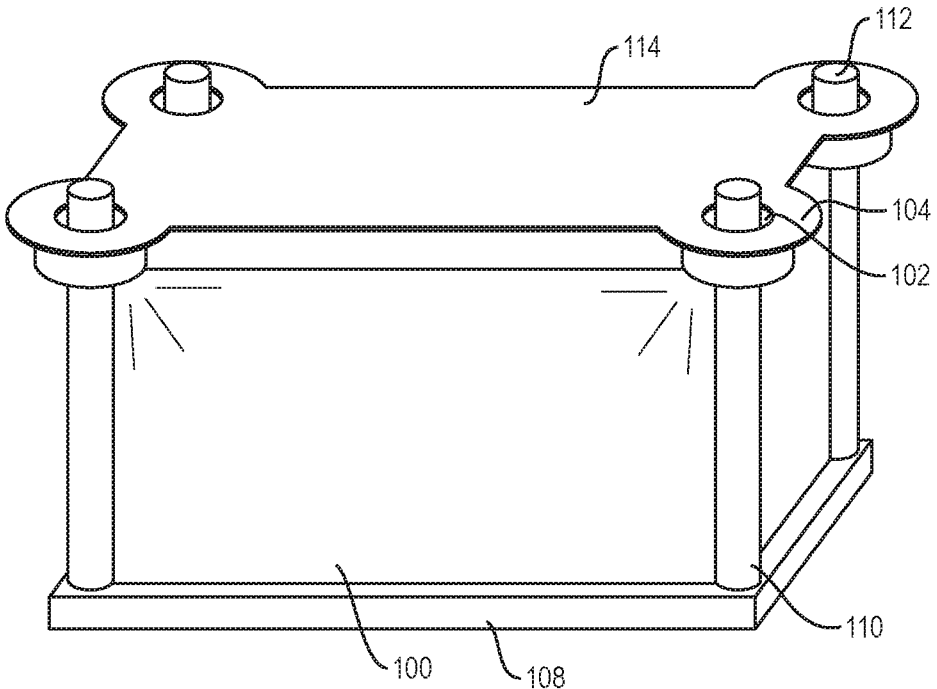
FIG. 9 shows the biocontainer of FIG. 7 mounted in the holder of FIG. 8 in planar view.

FIG. 9 shows the biocontainer 100 of FIG. 7 mounted in the holder of FIG. 8 in planar view. If desired, additional secondary substantially horizontal rods 114 (not shown) can be located between the adjacent rods 110 at a location or locations further toward the base 108 than the first set of rods 108. Alternatively, panels (not shown) may be used in lieu of or in conjunction with the secondary substantially horizontal rods 114.

Two layers of the PureFlex™ film were formed into a pouch, which were approximately 200 mm by 250 mm and subjected to a burst test. (PureFlex™ from EMD Millipore Corp.). The PureFlex™ film consists of a first ultralow density polyethylene layer, an EVOH layer disposed thereon, an EVA resin layer disposed on the EVOH layer, and a second ultralow density polyethylene layer disposed on the EVA resin layer, wherein the PureFlex™ film is approximately 0.25 mm in thickness. In some embodiments, the first ultralow density polyethylene layer is a fluid contact layer. In some embodiments, the second ultralow density polyethylene layer is a fluid contact layer. Also, in some embodiments, the EVA resin layer comprises an EVA copolymer resin. For example, the EVA copolymer resin may comprise approximately 20-30% by weight ethylene vinyl acetate. In some embodiments, the EVA resin layer comprises approximately 28% by weight ethylene vinyl acetate. In some embodiments, the EVA resin layer comprises approximately 28% by weight ethylene vinyl acetate blended with low density polyethylene. In some embodiments, the EVA resin layer comprises an ELVAX® resin as marketed by the E.I. duPont De Nemours of Wilmington, DE, USA. Several of the PureFlex™ pouches were tested and burst between 7-8 pounds per square inch (psi).

Similarly, two layers of the film 2, as described with respect to FIG. 1C, were formed into pouches and underwent the same burst testing. These pouches burst at 29 psi.

Tensile strength testing was also performed according to ASTM 638. The tensile strength at break of the film 2, such as the film 2 as described in FIG. 1C, was approximately 5000 psi. Conversely, the PureFlex™ films exhibited a tensile strength at break of approximately 2100 psi.

Abrasion testing was also performed. The film, such as the film 2, as described in FIG. 1C, generally withstood 4000-6900 strokes, i.e., twists. Conversely, the PureFlex™ films could withstand only 150 strokes.

EXAMPLES

Example 1

Biocontainer films were compared to the composite film 2 made in according to the present disclosure according to the Gelbo Flex ASTM F392 standard. The Pureflex™ film, as described below, was a multilayered laminated film having an inner contact zone, an intermediate oxygen barrier zone and an outer protective zone formed of plastic only. The film was approximately 0.020 inches in thickness (0.50 mm). In some embodiments, the PureFlex® film has a contact layer that comprises an ethylene alpha-olefin resin. For example, some exemplary ethylene alpha-olefin resins are marketed under the brand AFFINITY® by Dow Corp., of Midland, MI, USA.

A sample of Pureflex™ film was modified so that the outer zone had a layer of EVOH resin, for e.g., as provided by Kuraray Co., Ltd, Premium Pack, GmbH, SOARNOL®, marketed by Soarus, LLC, Arlington Heights, IL, USA and/or others, to improve flex crack resistance. In some embodiments, the EVOH layer comprises an ethylene vinyl alcohol copolymer, optionally having a low melt flow rate.

A sample of flat tube standard film with flex crack resistant resin was approximately 0.014-0.020 inches in thickness (0.35-0.50 mm).

A sample of the film according to the present disclosure was made by lamination of an inner contact zone formed of a polyolefinic resin, an intermediate zone containing a substrate, e.g., a nylon woven substrate, obtained from Sefar, Inc., of Buffalo, NY, USA, having a mesh count of 86 in both the weft and warp direction and a thickness of approximately 150 microns, oxygen barrier zone formed of an EVOH resin and an outer layer of a flex crack resistant resin with a tie layer between each zone.

The values in Table 1 are an average for the 3 samples of each film tested. Specifically, a standard film having flex crack resistant resin, a flat tube standard film having flex crack resistant resin, and a composite film having substrate buffer layer and flex crack resistant layer, which are compared with results for a standard film (PureFlex™ from EMD Millipore Corp.). The PureFlex™ film consists of a first ultralow density polyethylene layer, an EVOH layer disposed thereon, an EVA resin layer disposed on the EVOH resin layer, and a second ultralow density polyethylene layer disposed on the EVA resin layer, wherein the PureFlex™ film is approximately 0.25 mm in thickness. In some embodiments, the first ultralow density polyethylene layer is a fluid contact layer. In some embodiments, the second ultralow density polyethylene layer is a fluid contact layer. Also, in some embodiments, the EVA layer comprises an EVA copolymer resin. For example, the EVA copolymer resin may comprise approximately 20-30% by weight ethylene vinyl acetate. In some embodiments, the EVA resin layer comprises approximately 28% by weight ethylene vinyl acetate. In some embodiments, the EVA resin layer comprises approximately 28% by weight ethylene vinyl acetate blended with low density polyethylene. In some embodiments, the EVA resin layer comprises an ELVAX® resin as marketed by the E.I. duPont De Nemours of Wilmington, DE, USA.

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "in one embodiment," "some embodiments," or "in an embodiment" throughout this specification are not necessarily referring to the same embodiment.

Publications of patent applications and patents and other non-patent references, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed:

1. A material for biocontainers comprising:
three layers, wherein the three layers are ordered as an inner contact zone, a gas impermeable zone, and an outer strength zone comprising two layers of polyethylene;
wherein the inner contact zone comprises a first interior side layer and an exterior side layer, the first interior side layer comprising an ethylene vinyl acetate and the exterior side layer comprising ultra-low density polyethylene;
wherein the gas impermeable zone comprises an ethylene vinyl alcohol material; and
a stress-inhibiting substrate disposed between the inner contact zone and the gas impermeable zone, wherein the stress-inhibiting substrate is formed of a fibrous polyamide material and wherein the stress-inhibiting substrate is embedded within an ethylene vinyl acetate resin, forming a discontinuity wherein cracks cannot propagate into or through the inner contact zone;
a first tie layer comprising ethylene vinyl acetate disposed between the gas impermeable zone and the stress-inhibiting substrate; and
a second tie layer comprising ethylene vinyl acetate disposed between the stress-inhibiting substrate and inner contact zone, forming a flexible material having an embedded substate that is resistant to stress concentrations and cracks, maintaining sterility.

2. The material of claim 1 wherein the stress-inhibiting substrate is formed of a material selected from the group consisting of woven and non-woven fibrous material.

3. The material of claim 1 wherein the stress-inhibiting substrate is a woven material selected from the group consisting of polymer fibers, metal fibers, carbon fibers and glass fibers.

4. The material of claim 1 wherein the stress-inhibiting substrate is formed of a non-woven fibrous material selected from the group consisting of polyamide, polyester, aramids, carbon, metal, glass and polyolefins.

5. The material of claim 1 wherein the stress-inhibiting substrate has one or more openings formed in it to provide a device selected from the group consisting of a viewing window and a port.

\* \* \* \* \*